(12) United States Patent
Kim et al.

(10) Patent No.: US 8,463,785 B2
(45) Date of Patent: Jun. 11, 2013

(54) METHOD AND SYSTEM FOR GENERATING SEARCH COLLECTION OF QUERY

(75) Inventors: Byounghak Kim, Seoul (KR); Tae Yeong Kwak, Seoul (KR)

(73) Assignee: NHN Corporation, Seongnam-si (KR)

( * ) Notice: Subject to any disclaimer, the term of this patent is extended or adjusted under 35 U.S.C. 154(b) by 263 days.

(21) Appl. No.: 12/675,651

(22) PCT Filed: Aug. 4, 2008

(86) PCT No.: PCT/KR2008/004525
§ 371 (c)(1),
(2), (4) Date: Feb. 26, 2010

(87) PCT Pub. No.: WO2009/031759
PCT Pub. Date: Mar. 12, 2009

(65) Prior Publication Data
US 2010/0257169 A1  Oct. 7, 2010

(30) Foreign Application Priority Data
Sep. 6, 2007 (KR) .................. 10-2007-0090460

(51) Int. Cl.
G06F 7/00    (2006.01)
G06F 17/30   (2006.01)

(52) U.S. Cl.
USPC ................. 707/737; 707/738; 707/768

(58) Field of Classification Search
USPC ........................................ 707/737
See application file for complete search history.

(56) References Cited

U.S. PATENT DOCUMENTS

| | | | | |
|---|---|---|---|---|
| 6,415,282 | B1 * | 7/2002 | Mukherjea et al. | 707/737 |
| 7,269,545 | B2 * | 9/2007 | Agichtein et al. | 704/9 |
| 7,447,678 | B2 * | 11/2008 | Taylor et al. | 1/1 |
| 7,571,162 | B2 * | 8/2009 | Sun et al. | 1/1 |
| 7,774,345 | B2 * | 8/2010 | MacLaurin et al. | 707/736 |
| 7,779,009 | B2 * | 8/2010 | Chowdhury et al. | 707/737 |
| 7,877,404 | B2 * | 1/2011 | Achan et al. | 707/768 |
| 7,890,378 | B2 * | 2/2011 | Clarke et al. | 705/26.62 |
| 2003/0037050 | A1 * | 2/2003 | Monteverde | 707/6 |
| 2004/0220902 | A1 * | 11/2004 | Gates et al. | 707/3 |
| 2005/0144065 | A1 * | 6/2005 | Calabria et al. | 705/14 |
| 2005/0165744 | A1 * | 7/2005 | Taylor et al. | 707/3 |
| 2007/0022111 | A1 * | 1/2007 | Salam et al. | 707/5 |
| 2007/0027856 | A1 * | 2/2007 | Lee | 707/3 |
| 2007/0192293 | A1 * | 8/2007 | Swen | 707/3 |
| 2008/0021889 | A1 * | 1/2008 | Nam et al. | 707/3 |
| 2008/0250060 | A1 * | 10/2008 | Grois | 707/102 |
| 2009/0222444 | A1 * | 9/2009 | Chowdhury et al. | 707/5 |
| 2010/0082590 | A1 * | 4/2010 | Nye | 707/706 |

FOREIGN PATENT DOCUMENTS

| | | |
|---|---|---|
| JP | 2005-182280 | 7/2005 |
| JP | 2005-322165 | 11/2005 |
| JP | 2006-127325 | 5/2006 |
| JP | 2007-172375 | 7/2007 |
| KR | 1020030051577 | 6/2003 |
| KR | 1020030066064 | 8/2003 |
| KR | 1020060103165 | 9/2006 |
| KR | 1020070013867 | 1/2007 |
| WO | 2004/034243 | 4/2004 |

\* cited by examiner

*Primary Examiner* — Binh V Ho
(74) *Attorney, Agent, or Firm* — H.C. Park Associates, PLC

(57) ABSTRACT

A method for generating search collection of query is disclosed, which can provide a search result list displayed by an optimized method of automatically generating a specific collection by each query, the method comprising obtaining a first query and search results selected by a user from a search result list generated in response to the first query; classifying the search results into one or more groups; and generating a search collection for the first query by each group.

18 Claims, 4 Drawing Sheets

METHOD AND SYSTEM FOR GENERATING SEARCH COLLECTION OF QUERY

CROSS-REFERENCE TO RELATED APPLICATIONS

This application is the National Stage of International Application No. PCT/KR2008/004525, filed Aug. 4, 2008, and claims priority from and the benefit of Korean Patent Application No. 10-2007-0090460, filed on Sep. 6, 2007, which are both hereby incorporated by reference for all purposes as if fully set forth herein.

BACKGROUND OF THE INVENTION

1. Field of the Invention

The present invention relates to a method and system for providing a search service by Internet, and more particularly, to a method and system for generating search collection in response to each query input by a user for a search process.

2. Discussion of the Background

Development and widespread of Internet have brought various kinds of services through the use of Internet, one typical example of which is a search service. The search service makes a search for a query input by a service user (for example, a website including a search query input by a service user, or an image with a file name including a corresponding search query), and provides search results generated in response to the corresponding search query to the service user.

In case of a general search service, the search results generated in response to the corresponding query input by the user are classified according to predetermined search collection, for example, 'up-to-date news', 'image', or 'blog', whereby the user is provided with the search results classified by the search collection.

However, when providing the search results generated through the use of general search service, the search results are classified according to the predetermined search collections without regard to properties of the query.

In order to overcome this problem, a method for controlling the kind and number of search collections according to the query has been proposed. In this case, the queries are firstly classified according to category, and then the search collection for the corresponding category is provided to the user when the query included in the specific category is input by the user. This method remains the related-art problem, that is, it is difficult to provide the search result with the search collection on which the user's search intention is reflected.

SUMMARY OF THE INVENTION

Therefore, the present invention has been made in view of the above problems, and it is an object of the present invention to provide a method and system for generating a search collection in response to each query by automatically generating a search collection in response to each query.

Another object of the present invention is to provide a method and system for generating a search collection displayed by a search collection mapped to a corresponding query on receiving a search request for the corresponding query.

Another object of the present invention is to provide a method and system for generating a search collection in response to each query, in which a user's search intention is reflected on a search result for each query.

A further object of the present invention is to provide a method and system for generating a search collection in response to each query, in which the search collection for each query is updated every predetermined period so as to reflect a user's search intention on the search collection.

To achieve these objects and other advantages and in accordance with the purpose of the invention, as embodied and broadly described herein, a method for generating a search collection by each query comprises obtaining a first query and search results selected by a user from a search result list generated in response to the first query; classifying the search results into one or more groups; and generating a search collection for the first query by each group.

At this time, the search results correspond to search result URLs. Also, the search results, whose respective webpages have the same subject, are categorized into the same group when classifying the search results. The subject of the respective webpages corresponding to the search results may be extracted from a categorization criterion of the respective websites, or the subject of the respective webpages corresponding to the search results may be extracted from at least one of a title or contents of the respective webpages corresponding to the search results.

The method further comprises generating group information by each group before generating the search collection, wherein the search collection of the first query is generated through the use of group information by each group. At this time, the group information by each group is generated through the use of a subject of the respective webpages corresponding to the search results.

Also, the method includes receiving a second query from the user; and classifying and providing search results for the second query according to the search collection of the first query when the second query is identical to the first query. Also, the method includes calculating a percentage of each group in the search results of the second query, before providing the search results for the second query, wherein the search collection corresponding to the group of high percentage is ranked higher than the search collection corresponding to the group of low percentage. The percentage of each group is calculated using the total number of the search results and the number of search results included in each group. Also, the method includes mapping the search collection of the first query to the first query after generating the search collection.

The method includes deleting or changing the stored search collection, or generating and storing a new search collection by repetitively performing the aforementioned steps every predetermined period.

In another aspect of the present invention, a system for generating a search collection by each query comprises a data extracting unit configured to obtain a first query and search results selected by a user from a search result list generated in response to the first query; a search result classifying unit configured to classify the search results into one or more groups; and a search collection generating unit configured to generate a search collection of the first query by each group.

It is to be understood that both the foregoing general description and the following detailed description of the present invention are exemplary and explanatory and are intended to provide further explanation of the invention as claimed.

The method and system for generating the search collection by each query according to the present invention has the following advantages.

The specific search collection can be automatically generated by each query.

When providing the search result list generated in response to the corresponding query, the search result list is displayed through the use of specific search collection generated by each query. Accordingly, the search result for each query is provided through the optimized method.

When generating the search collection for each query, the user's search intention can be reflected on the search collection through the use of search result URLs selected by the user from the search result list generated in response to the corresponding query.

Also, the search collection for each query is updated every predetermined period, whereby the user's search intention can be rapidly reflected on the search collection.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method and system for generating a search collection by each query according to the present invention will be described with reference to the accompanying drawings.

Figure 1:
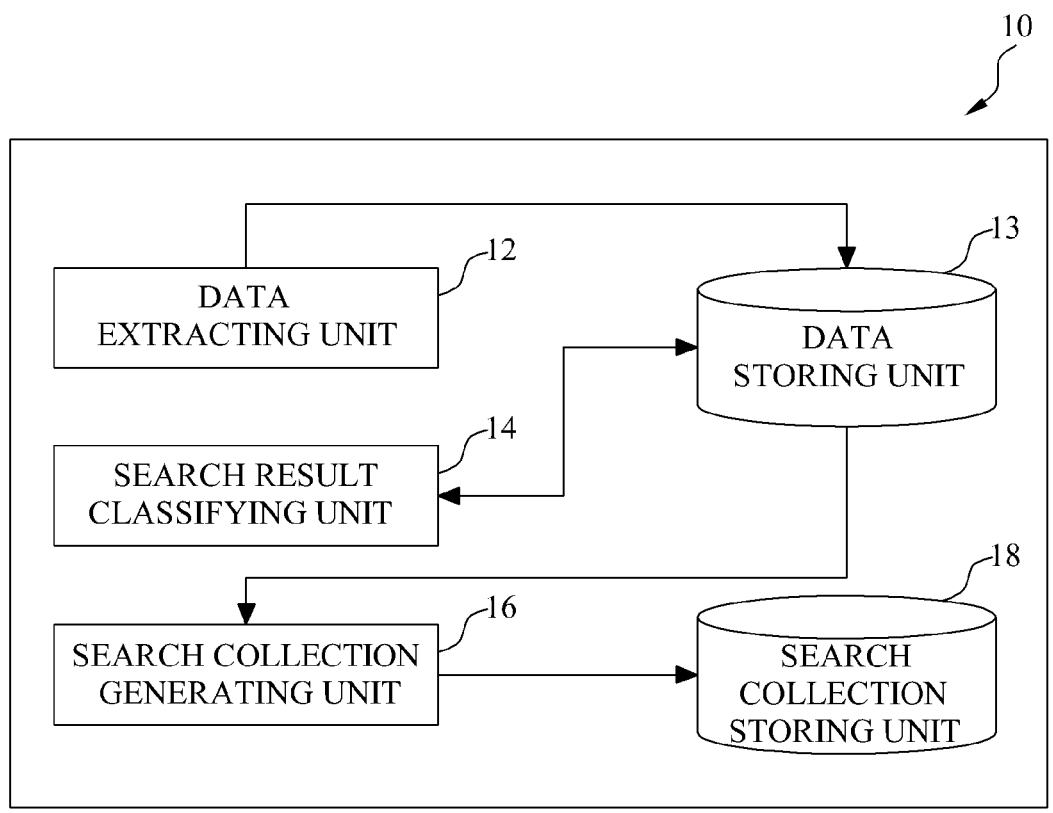
FIG. 1 is a block diagram of a system for generating a search collection by each query according to one embodiment of the present invention.

FIG. 1 is a block diagram of a system for generating a search collection by each query according to one embodiment of the present invention. As shown in FIG. 1, a search collection generating system 10 comprises a data extracting unit 12, a data storing unit 13, a search result classifying unit 14, a search collection generating unit 16, and a search collection storing unit 18.

The data extracting unit 12 obtains a specific query and one or more search results selected by a user in a search result list of the specific query from a log storing unit (not shown) with log information relating to user's search history, and stores the obtained query and search result in the data storing unit 13.

In one embodiment of the present invention, the data extracting unit 12 obtains uniform resource locators (hereinafter, referred to as "URLs") corresponding to the search results, and stores the obtained URLs in the data storing unit 13. For convenience of the explanation, it is assumed that the search results generated in response to the specific query correspond to search result URLs, but it is not limited to this.

An exemplary case for obtaining the query and search result URLs in response to the corresponding query in the data extracting unit 12 will be explained as follows.

When a first user selects the search result URL of http://spiderman.sonypictures.com/, a second user selects the search result URL of http://ultimatespidermanaame.com/, and a third user selects the search result URL of http://www-.sonypictures.com/homevideo/spider-man2/from the search result list generated in response to the specific query "spider-man", the data extracting unit 12 obtains the query "spider-man" and all the search result URLs selected by the user from the search result list generated in response to the query "spider-man" from the log storing unit with all data stored therein.

At this time, the data extracting unit 12 may obtain all queries stored in the log storing unit and the search result URLs selected by the user from the search result list generated in response to the corresponding query. In a modified embodiment of the present invention, the data extracting unit 12 may obtain the corresponding query searched by the user more than the predetermined number of times, and the search result URLs selected by the user from the search result list generated in response to the corresponding query.

The query and selected search result URLs mapped to each other are stored in the data storing unit 13. Also, group information for each group generated by the search result classifying unit 14 and the search result URLs included in each group are stored in the data storing unit 13. In the aforementioned embodiment of the present invention, the data storing unit 13 is included in the search collection generating system 10. However, the data storing unit 13 may be separated from the search collection generating system 10.

The search result classifying unit 14 classifies the search result URLs stored in the data storing unit 13 into one or more groups. In one embodiment of the present invention, the search result classifying unit 14 may classify the search result URLs according to subject of webpages corresponding to the search result URLs. That is, if webpages corresponding to predetermined search result URLs have the same subject, the predetermined search result URLs are included in the same group. In this case, the subject of webpages corresponding to the respective search result URLs can be extracted from a categorization criterion of website corresponding to the search result URL. For example, a category of website corresponding to the search result URL corresponds to 'game', the subject of corresponding search result URL is determined as 'game'.

In a modified embodiment of the present invention, the subject of webpage corresponding to each search result URL may be extracted through the use of title or contents in the corresponding webpage. In more detail, the subject of corresponding webpage is extracted through the use of most-frequently mentioned word among words included in the title or contents of the corresponding webpage. For example, when the word 'movie' is most frequently mentioned in the title or contents of the corresponding webpage, the subject of corresponding search result URL is determined as the 'movie'.

In the meantime, when the search result URLs with the same subject are categorized into one group, the search result classifying unit 14 generates the group information by each group. In one embodiment of the present invention, the group information for each group can be determined with the subject for each group. For example, the group information for the group whose subject is 'movie' is determined as 'movie', and the group information for the group whose subject is 'game' is determined as 'game'.

Then, the search result classifying unit 14 maps the group information for each group to the corresponding query, and stores the group information and corresponding query mapped to each other in the data storing unit 13.

The search collection generating unit 16 generates a search collection by each query through the use of group information generated by the search result classifying unit 14, and stores the generated search collection in the search collection storing unit 18. In this case, the search collection indicates information to be a criterion for ranking the search result such as news, images, and blogs. For example, when one group of which the group information is 'movie' and the other group of which the group information is 'game' are generated about the query 'spider-man', the search collection generating unit 16 generates the group information 'movie' and 'game' as the search collections relating to the query 'spider-man'. As a result, the search collection generating unit 16 generates the specific search collection by each query.

Figure 2:
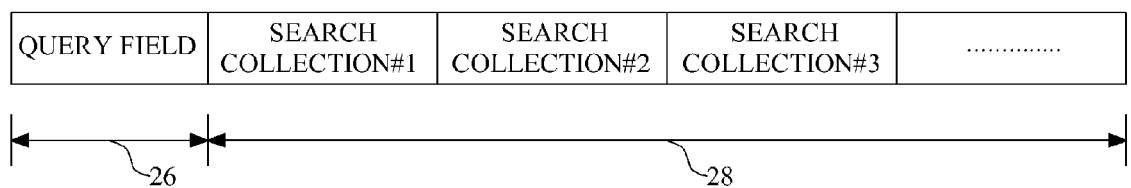
FIG. 2 is a block diagram of a data structure of search collection by each query stored in a search collection storing unit.

The search collection generated by the search collection generating unit 16 is mapped to the corresponding query, and is stored in the search collection storing unit 18. As shown in FIG. 2, a data structure of search collection stored in the search collection storing unit 18 is comprised of one query field 26 and one or more search collection fields 28. In this case, the corresponding query is recorded in the query field 26, and the search collection generated through the use of group information of each search result URL is recorded in each search collection field 28.

In one embodiment of the present invention, the data extracting unit 12 in the search collection generating system 10 obtains the data from the log storing unit every predetermined period, whereby the data stored in the data storing unit 13 is updated every predetermined period. Also, the search result classifying unit 14 can change or delete the existing group, or can generate and add a new group by classifying the updated search result URLs. Furthermore, the search collection generating unit 16 can update the search collection by changing, deleting, or adding the search collection through the use of group information for the group changed, deleted, or added. As a result, the user's search intention for each query is rapidly reflected through the data-update function.

For example, the search result URLs selected by the user from the search result list generated in response to the specific query are limited to the specific movie before update of the search collection. However, if the game or book related with the corresponding movie is produced or published with the great box-office success of the corresponding movie, the user may select the search result URLs related with the game or book of the corresponding movie after generating the search result list in response to the same query. Accordingly, the search collection generating system according to the present invention can add the search collection such as 'game' or 'book' relating to the specific query by obtaining the newly-updated information from the log storing unit, thereby resulting in rapid reflection of user's search intention on the search result list of the specific query.

The aforementioned embodiment of the present invention discloses the search collection storing unit 18 included in the search collection generating system 10. However, the search collection storing unit 18 may be separated from the search collection generating system 10.

In order to realize the user's convenience when the user selects the desired search result URL from the search result list generated in response to the specific query, the search result list is displayed while being categorized according to search collection responsive to the specific query. For this, the search collection generating system may be linked with a search system (not shown) for performing a search function, may include search units for performing a search function, or may be included in a search system.

Hereinafter, the search collection generating system including the search units for performing the search function according to the embodiment of the present invention will be explained as follows.

Figure 3:
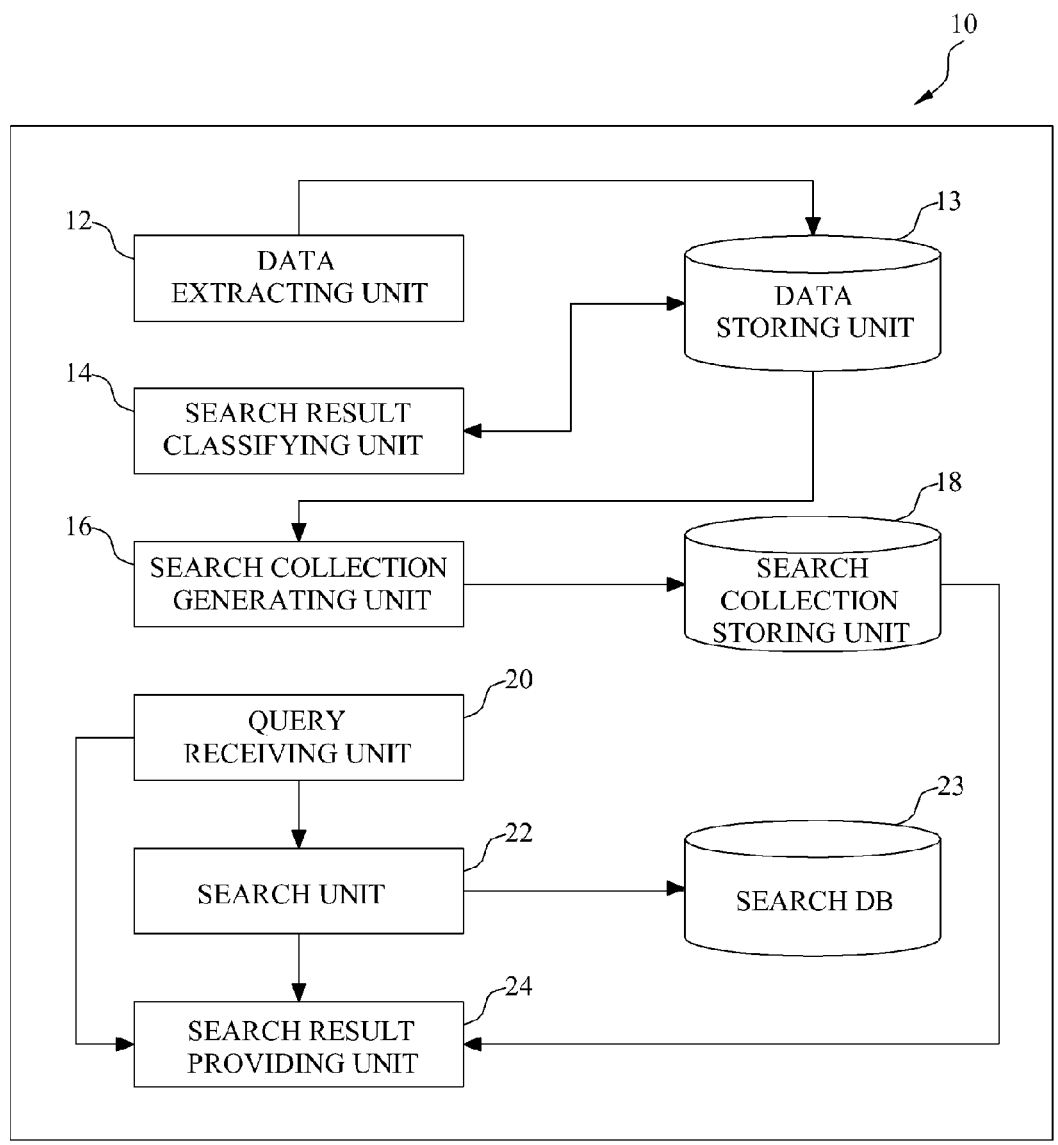
FIG. 3 is a block diagram of a system for generating a search collection by each query, the system with a search function, according to one embodiment of the present invention.

FIG. 3 is a block diagram of the search collection generating system including the search units for performing the search function according to the embodiment of the present invention. In this case, a data extracting unit 12, a data storing unit 13, a search result classifying unit 14, a search collection generating unit 16, and a search collection storing unit 18 shown in FIG. 3 are identical in function to those of FIG. 1, whereby the detailed explanation for the aforementioned units shown in FIG. 3 will be omitted.

A query receiving unit 20 receives the query from the user, and a search unit 22 performs the search for the query received through the query receiving unit 20 in a search database 23.

The search unit 22 generates the search result list with the search result URLs through the search, and transmits the generated search result list to a search result providing unit 24.

The search result providing unit 24 determines whether or not the query received through the query receiving unit 20 is stored in the search collection storing unit 18. When the search query received through the query receiving unit 20 is stored in the search collection storing unit 18, the search result providing unit 24 obtains the search collection mapped to the corresponding query from the search collection storing unit 18, and provides the search result list while being categorized according to the obtained search collection.

In one embodiment of the present invention, if the predetermined search result URL is not included in the obtained search collection, it is categorized into an additional group, and is separately displayed on a predetermined area, whereby the predetermined search result URL which is not included in the obtained search collection is provided to the user.

When the query received through the query receiving unit 20 is not stored in the search collection storing unit 18, the search result providing unit 24 provides the search result list categorized according to the general search collection to the user.

In the aforementioned embodiment of the present invention, the search result providing unit 24 determines whether or not the received query is stored in the search collection storing unit 18. However, in a modified embodiment of the present invention, the query receiving unit 20 may directly determine whether or not the received query is stored in the search collection storing unit 18, and may provide the result to the search result providing unit 24.

When the search result providing unit 24 provides the search result list to the user, the search collections are ranked according to weight of each search collection mapped to the query, that is, the search collection with high weight is ranked higher than the search collection with low weight. For this, the search collection generating system 10 includes an additional calculating unit (not shown) which calculates the weight of search collection mapped to the corresponding query.

The calculating unit calculates the percentage of each group by using the number of search result URLs included in each group of the corresponding query, to thereby calculate the weight of each search collection. In more detail, the percentage of each group in the entire search result list is calculated using the total number of search result URLs mapped to each query and the number of search result URLs included in the specific group. Thus, the weight of search collection mapped to the group information of corresponding group is determined based on the percentage of corresponding group.

The search result providing unit 24 provides the search result list such that the search collection with high weight is ranked higher than the search collection with low weight.

In another embodiment of the present invention, the search result providing unit 24 categorizes the search result list through the use of general search collection instead of through the use of search collection generated by each query, whereby only the search collection with the highest weight is ranked to the top of search result list. That is, when providing the search result list based on the general search collection, the search collection most-frequently selected by the users is ranked to the top of search result list. Accordingly, the search collection with the most-preferred subject in relation with the corresponding query is ranked to the top of search result list, whereby the user can read the search collection with the most-preferred subject while being ranked to the top of search result list.

If the search function is provided by the search collection generating system 10 linked with the external search system, the search collection generating system 10 receives the query input by the user from the search system. In this case, when the received query is stored in the search collection storing unit 18, the search collection generating system 10 transmits the search collection for the corresponding query to the search system. Meanwhile, when the received query is not stored in the search collection generating system 10, the corresponding information is transmitted to the search system.

In case of that the search collection generating system 10 is included in the external search system, it is substantially identical in structure to the search collection generating system 10 comprising the search units for performing the search function, so that the detailed explanation for the search collection generating system 10 included in the external search system will be omitted.

Figure 4:
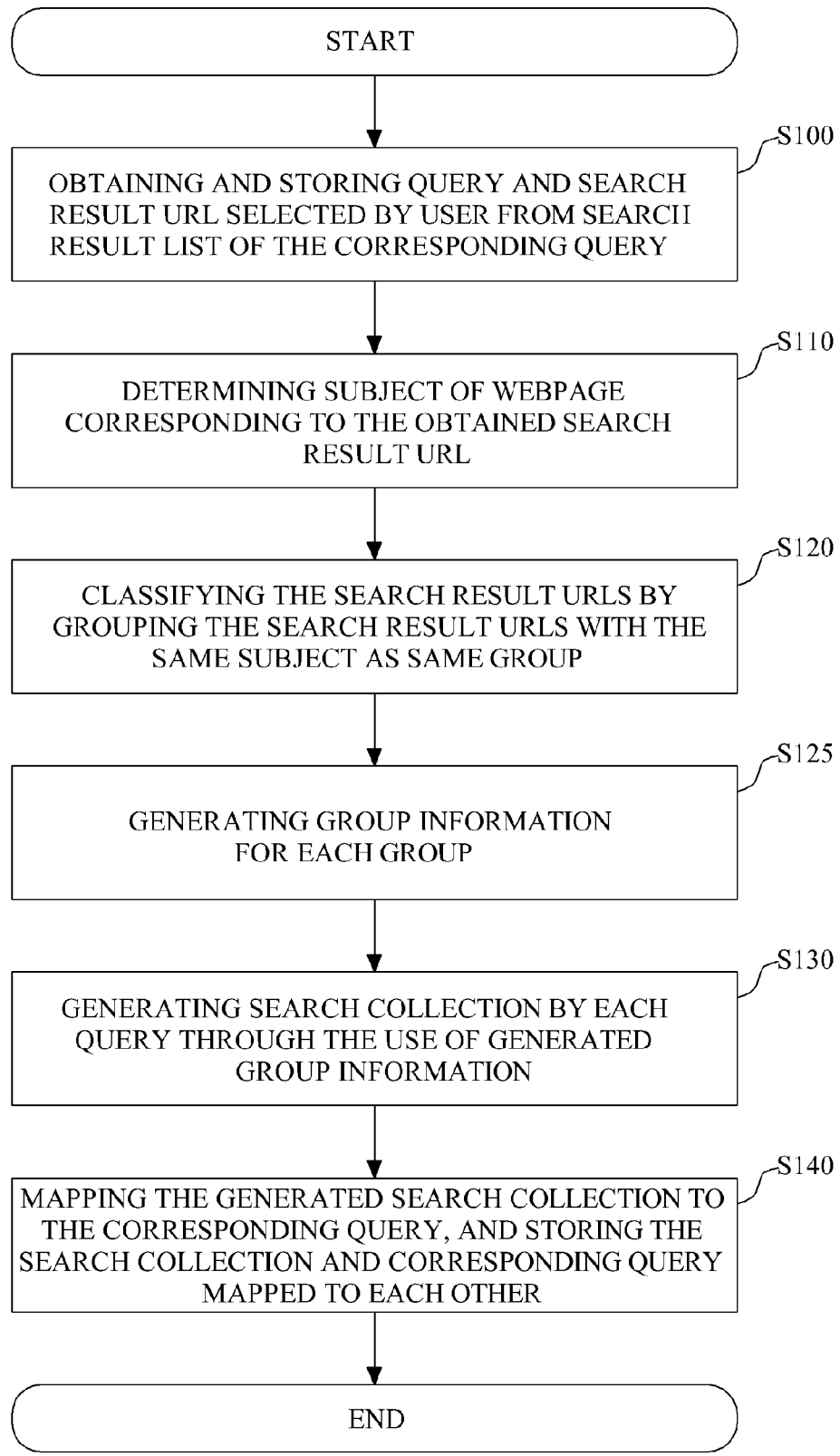
FIG. 4 is a flow chart of a method for generating a search collection by each query according to one embodiment of the present invention.

Hereinafter, a method for generating the search collection according to one embodiment of the present invention will be explained with reference to FIG. 4.

First, the query and the search result URL selected by the user from the search result list generated in response to the corresponding query are obtained from the log storing unit, and are stored in the data storing unit 13 in step 100. As explained above, all queries input by the users and the search result URLs selected by the users from the search result list generated in response to the input queries may be obtained from the log storing unit. In the modified embodiment of the present invention, the specific query whose input count is above a predetermined value and the search result URLs of the specific query are obtained from the log storing unit.

Then, the subject of webpage corresponding to the obtained search result URLs is determined in step 110. In this case, the subject of webpage corresponding to the each of search result URLs may be extracted from the categorization criterion of website corresponding to the search result URL, or may be extracted from the title or contents of webpage corresponding to each search result URL.

Thereafter, the search result URLs are classified into one or more groups according to the subject of webpage, whereby the search result URLs with the same subject are categorized into one group in step 120. Then, the group information for each group is generated in step 125. In one embodiment of the present invention, the group information for each group may be determined through the use of subject for each group. For example, the group information with the subject related with the movie is determined as the movie, and the group information with the subject related with the game is determined as the game.

Then, the search collection is generated by each query through the use of generated group information in step 130. In this case, the search collection indicates information to be a criterion for ranking the search result such as news, images, and blogs. For example, when one group with the group information for 'movie' and the other group with the group information for 'game' are generated in response to the query 'spider-man', the search collections of 'movie' and 'game' are generated in response to the query 'spider-man'. Through this procedure, the specific search collection is generated by each query.

The generated search collection is mapped to the corresponding query, and is stored in step 140. At this time, the search collection may be stored in the structure of FIG. 2. In more detail, the corresponding query is recorded in the query field, and the search collection generated through the use of group information for each of the search result URLs is recorded in the search collection field.

In one embodiment of the present invention, the repetitive performance of the aforementioned procedure in the method for generating the search collection every predetermined period enables the update of search collection every predetermined period. As a result, the user's search intention for each query is rapidly reflected through the data-update function. According as the data is obtained from the log storing unit every predetermined period, the data stored in the data storing unit is updated, and the updated search result URLs are classified again. Thus, the search collection may be changed, deleted, or added through the use of group information for the group changed, deleted, or added.

Figure 5:
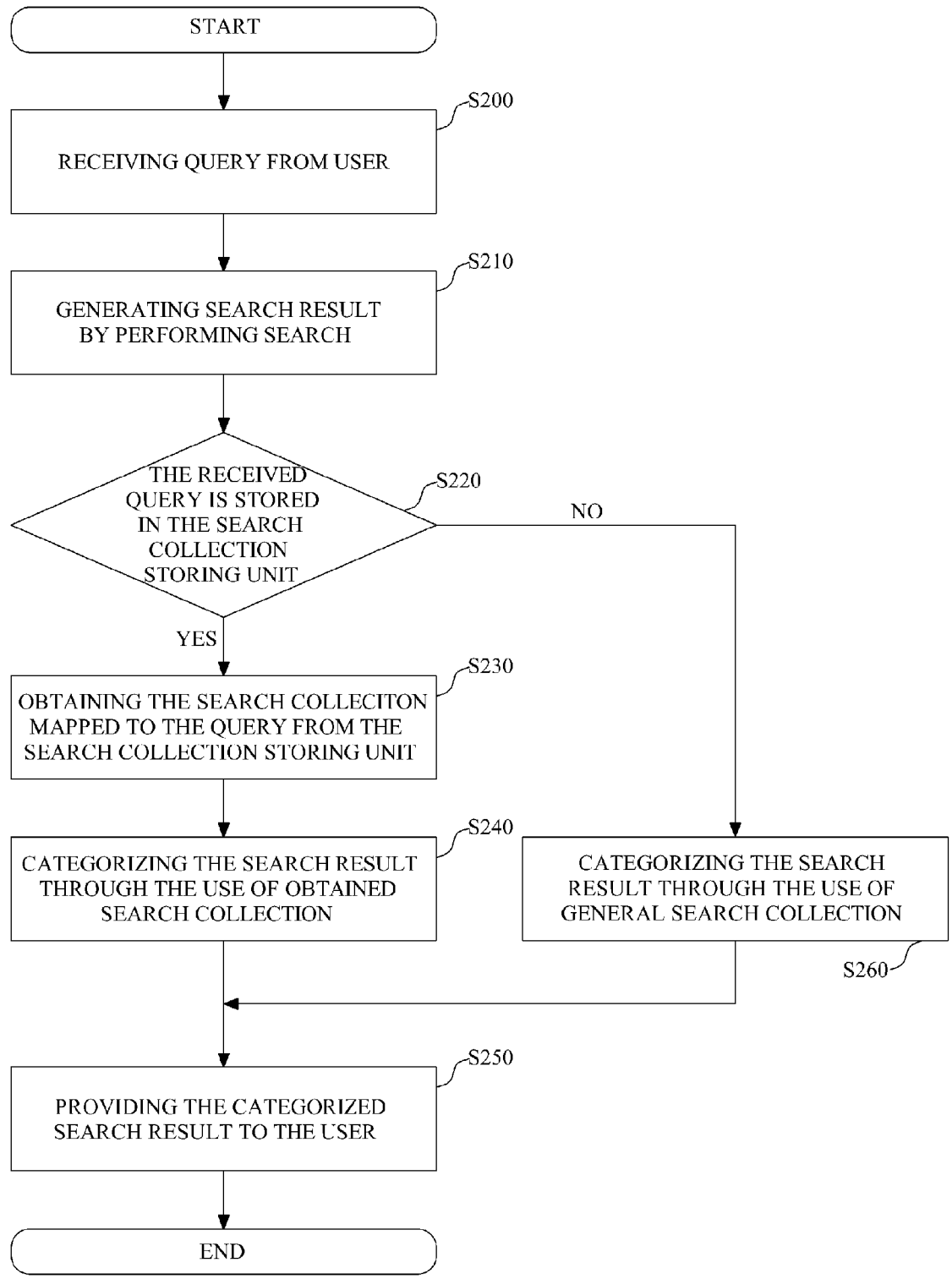
FIG. 5 is a flow chart of a method for providing a search result through the use of search collection generated by the method of FIG. 4.

FIG. 5 is a flow chart of a method for providing the search result list categorized according to the search collection by each query according to one embodiment of the present invention.

As mentioned above, the search collection generating system may be linked with the search system (not shown) for performing the search function, may include the search units for performing the search function, or may be included in the search system.

First, when the query is received from the user in step 200, the search for the received query is performed through the use of search database 23, whereby the search result list is generated in step 210. Then, it is determined whether or not the query received from the user is stored in the search collection storing unit 18 in step 220. When the query received from the user is stored in the search collection storing unit 18, the search collection mapped to the corresponding query is obtained from the search collection storing unit 18 in step 230.

Then, the search result list generated in step 210 is categorized through the use of the obtained search collection in step 240. Then, the user is provided with the categorized search result in step 250. In this case, the search result URLs, which are not included in the obtained search collection, are grouped into the separate group, so that the user can be provided with them to be displayed on the predetermined area.

In one embodiment of the present invention, when providing the search result list to the user, the search result list is categorized using the weight of search collection mapped to the query, that is, the search collection with high weight is ranked to the top of search result list. For this, the search collection generating method according to one embodiment of the present invention may further comprise the step of calculating the weights of search collections mapped to the corresponding query.

At this time, the weight of search collection is calculated based on the percentage of each group through the number of search result URLs included in the group of the corresponding query. In more detail, the percentage of each group in the entire search result list is calculated using the total number of search result URLs mapped to each query and the number of search result URLs included in the specific group. Thus, the weight of search collection mapped to the group information of corresponding group is determined based on the percentage of corresponding group.

In the meantime, when it is determined that the query received by the user in step 220 is not stored in the search collection storing unit 18, the search result list is displayed using the general search collection in step 260, and the displayed search result is provided to the user in step 250.

The aforementioned search collection generating method by each query can be implemented in the form of a program that can be executed using a variety of computer means. The program for performing the search result providing method is stored in a computer-readable recording medium such as a hard disk, a CD-ROM, a DVD, ROM, RAM, or a flash memory.

In the aforementioned embodiments of the present invention, the search result URLs are classified by the subject of webpage corresponding to each of the search result URLs. In the modified embodiment of the present invention, the search result URLs may be classified by the website type of webpage, for example, the website including the webpage corresponding to each search result URL may correspond to blog, bulletin board or general website. In another embodiment of the present invention, the search result URLs may be classified by the format of webpage, for example, the webpage corresponding to the search result URL may correspond to image, text or moving picture.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method using a processor for generating a search collection of a query, the method comprising:
   obtaining a first query from a first user;
   providing a search result list in response to the first query;
   obtaining search result Uniform Resource Locators (URLs) selected by the first user from the search result list;
   classifying the selected search result URLs into one or more groups;
   generating group information for each group;
   generating a search collection of the first query according to the group information for each group;
   mapping the search collection to the first query;
   storing the first query and the search collection mapped to each other in a data storage;
   obtaining a second query from a second user;
   determining whether the second query is stored in the data storage;
   obtaining a search collection mapped to the second query when the second query is stored in the data storage;
   providing a search result list in response to the second query, the search result list in response to the second query being categorized based on the obtained search collection mapped to the second query,
   wherein when it is determined that the second query is not stored in the data storage, the search result list in response to the second query is provided using a predetermined general search collection; and
   providing search collection of the second query according to the search collection of the first query in response to determination of the second query being identical to the first query, wherein the search collection corresponding to a group of higher percentage is ranked higher than a search collection corresponding to a group of lower percentage, and wherein
   a percentage of each group is calculated using a total number of the search result list and a number of search result list of the each group.

2. The method of claim 1, wherein the search result list corresponds to search result Uniform Resource Locators (URLs).

3. The method of claim 1, wherein classifying the selected search result URLs into one or more groups comprises categorizing each of the search result lists into each group according to a subject of a corresponding webpage.

4. The method of claim 3, wherein a subject of each of webpages corresponding to the search result list is extracted from a categorization criterion of corresponding websites.

5. The method of claim 4, wherein the subject of each of the webpages corresponding to the search result list are extracted from at least one of a title of the webpages corresponding to the search results or contents of the webpages corresponding to the search result list.

6. The method of claim 1, further comprising:
   generating group information for each group, wherein a search collection of each query is generated by using the group information of each group.

7. The method of claim 6, wherein the group information for each group is generated by using subjects of the webpages corresponding to the search result list.

8. The method of claim 1, further comprising:
   mapping the search collection of the first query to the search collection of the second query.

9. The method of claim 8, further comprising:
   deleting or changing the stored search collection, or generating and storing a new search collection.

10. A non-transitory computer-readable medium comprising an executable program which, when executed, performs the steps of:
   obtaining a first query from a first user;
   providing a search result list in response to the first query;
   obtaining search result Uniform Resource Locators (URLs) selected by the first user from the search result list;
   classifying the selected search result URLs into one or more groups;
   generating group information for each group;
   generating a search collection of the first query according to the group information for each group;
   mapping the search collection to the first query;
   storing the first query and the search collection mapped to each other in a data storage;
   obtaining a second query from a second user;
   determining whether the second query is stored in the data storage;
   obtaining a search collection mapped to the second query when the second query is stored in the data storage;
   providing a search result list in response to the second query, the search result list in response to the second query being categorized based on the obtained search collection mapped to the second query, wherein when it is determined that the second query is not stored in the data storage, the search result list in response to the second query is provided using a predetermined general search collection; and providing search collection of the second query according to the search collection of the first query in response to determination of the second query being identical to the first query, wherein the search collection corresponding to a group of higher percentage is ranked higher than a search collection corresponding to a group of lower percentage, and wherein a percentage of each group is calculated using a total number of the search result list and a number of search result list of the each group.

11. A system to generate a search collection of a query, the system comprising:

a data extracting unit configured to obtain a first query from a first user, to provide a search result list in response to the first query, and to obtain search result Uniform Resource Locators (URLs) selected by the first user from the search result list;

a search result classifying unit configured to classify the selected search result URLs into one or more groups, to generate group information for each group, to generate a search collection of the first query according to the group information for each group, to map the search collection to the first query, to obtain a second query from a second user, to determine whether the second query is stored in a storage device, and to obtain a search collection mapped to the second query when the second query is stored in the storage device, wherein the first query and the search collection mapped to each other are stored in the storage device;

a search collection generating unit configured to provide a search result list in response to the second query, the search result list in response to the second query being categorized based on the obtained search collection mapped to the second query, wherein when it is determined that the second query is not stored in the data storage, the search result list in response to the second query is provided using a predetermined general search collection; and providing search collection of the second query according to the search collection of the first query in response to determination of the second query being identical to the first query, wherein the search collection corresponding to a group of higher percentage is ranked higher than a search collection corresponding to a group of lower percentage, and wherein a percentage of each group is calculated using a total number of the search result list and a number of the search result list of the each group.

12. The system of claim 11, wherein the search result list corresponds to search result Uniform Resource Locators (URLs).

13. The system of claim 11, wherein the search result classifying unit is configured to categorize the search result list into each group according to a subject of a webpage.

14. The system of claim 13, wherein a subject of each of the webpages corresponding to the search result list is extracted from at least one of a title of the respective webpages corresponding to the search result list or contents of the respective webpages corresponding to the search result list, or a categorization criterion of websites.

15. The system of claim 11, wherein the search result classifying unit is configured to generate group information for each group, and to generate the search collection of each query by using the group information for each group.

16. The system according to claim 15, wherein the search result classifying unit is configured to generate the group information for each group by using subjects of the webpages corresponding to the search result list.

17. The system of claim 11, further comprising:

a query receiving unit configured to receive search queries comprising a first search query and a second search query;

a search unit configured to determine whether the first search query and the second search query are identical; and a search result providing unit configured to provide the search collection result of the second query according to the search collection of the first query in response to determination of the second query being identical to the first query.

18. The system of claim 17, further comprising:

a calculating unit configured to calculate a percentage of the search result list obtained by the data extracting unit corresponding to each group, wherein the search result providing unit is configured to rank a search collection corresponding to group information according to the percentage of each group from high percentage to low percentage.

* * * * *